US008472662B2

(12) United States Patent
Muriello et al.

(10) Patent No.: US 8,472,662 B2
(45) Date of Patent: Jun. 25, 2013

(54) ASSOCIATING CAMERAS WITH USERS OF A SOCIAL NETWORKING SYSTEM

(75) Inventors: Daniel Muriello, Palo Alto, CA (US); Stephen Charles Heise, Los Altos, CA (US); Jie Chen, Sunnyvale, CA (US)

(73) Assignee: Facebook, Inc., Menlo Park, CA (US)

( * ) Notice: Subject to any disclaimer, the term of this patent is extended or adjusted under 35 U.S.C. 154(b) by 504 days.

(21) Appl. No.: 12/884,119

(22) Filed: Sep. 16, 2010

(65) Prior Publication Data

US 2012/0072493 A1 Mar. 22, 2012

(51) Int. Cl.
*G06K 9/00* (2006.01)

(52) U.S. Cl.
USPC .......................................................... 382/100

(58) Field of Classification Search
USPC .......................................................... 382/100
See application file for complete search history.

(56) References Cited

U.S. PATENT DOCUMENTS 6,636,259 B1 * 10/2003 Anderson et al. .......... 348/211.3
6,999,111 B2 * 2/2006 McIntyre et al. .......... 348/207.1
7,197,531 B2 * 3/2007 Anderson ..................... 709/203
7,433,710 B2 * 10/2008 Bodnar et al. ............. 455/556.1
7,535,492 B2 * 5/2009 Kahn et al. ................. 348/211.1
2002/0059431 A1 * 5/2002 Terada .......................... 709/227

* cited by examiner

*Primary Examiner* — Tom Y Lu
(74) *Attorney, Agent, or Firm* — Fenwick & West LLP

(57) ABSTRACT

Images uploaded by users of a social networking system are analyzed to determine signatures of cameras used to capture the images. A camera signature comprises features extracted from images that characterize the camera used for capturing the image, for example, faulty pixel positions in the camera and metadata available in files storing the images. Associations between users and cameras are inferred based on actions relating users with the cameras, for example, users uploading images, users being tagged in images captured with a camera, and the like. Associations between users of the social networking system related via cameras are inferred. These associations are used beneficially for the social networking system, for example, for recommending potential connections to a user, recommending events and groups to users, identifying multiple user accounts created by the same user, detecting fraudulent accounts, and determining affinity between users.

28 Claims, 4 Drawing Sheets

ASSOCIATING CAMERAS WITH USERS OF A SOCIAL NETWORKING SYSTEM

BACKGROUND

This invention relates to social networking systems, and in particular to inferring connections among users of a social networking system based on their interactions with images in the social networking system and the identity of cameras used to take the images.

Social networking systems store information about users and about the relationships between users. Users can perform actions using the social networking system, for example, users can indicate whether they participated in some event. Users frequently interact with each other via the social networking system, for example, by sending messages, by posting on a user's wall, by commenting on photos, or by sending recommendations to other users. Social networking systems collect information about the actions associated with users as well as the interactions between users over time.

The useful social information that is tracked and maintained by a social networking system can be thought of in terms of a "social graph," which includes a plurality of nodes that are interconnected by a plurality of edges. Each node in the social graph may represent something that can act on and/or be acted upon by another node. Common examples of nodes include users, non-person entities, content items, groups, events, messages, concepts, and any other things that can be represented by an object in a social networking system. An edge between two nodes in the social graph represents a particular kind of connection between the two nodes, which may result from an action that was performed by one of the nodes on the other node.

For example, if one user establishes a connection with another user in the social networking system, each of the two users is represented as a node, and the edge between the nodes represents the established connection. Continuing this example, one of these users may send a message to the other user within the social networking system. This act of sending the message is another edge between those two nodes, which can be tracked by the social networking system. The message itself may be treated as a node. In another example, if a user confirms attending an event, the user and the event are nodes, where the attendance of the event is the edge. Using a social graph, therefore, a social networking system may keep track of many different types of objects and the interactions and connections among those objects, thereby maintaining an extremely rich store of socially relevant information.

The social graph can be used by the social networking system for performing various actions, for example, for directing appropriate information to users. Social networking systems can use the social graph to identify recipients of particular newsfeed information based on actions of a user. Social networking systems can use the social graph to determine potential friends of a user and recommend them. Social networking systems can also use the social graph to direct different type of information to users including groups that the user may be interested in joining, events that the user may be interested in participating, or advertisements that are relevant to the user.

SUMMARY

Embodiments of the invention create associations between users of a social networking system based on their connections to images or videos that were taken from the same camera. In one embodiment, images are received from a user of the social networking system, and the received images are associated with a signature of the camera that was used to capture the images. The signature of the camera may comprise characteristic information about the camera obtained from the images taken from the camera. The social networking system then associates one or more users with the camera based on various interactions with or other connections to the images, either active or passive. For example, users may be connected to the camera by uploading the images, tagging someone in the images, being tagged in the images, commenting on the images, or any other action that relates to the images from that camera. Once the system determines that two or more users have some connection to the same camera, the system stores an association between the user accounts for those users.

This association may be leveraged in a variety of ways by the social networking system. In one embodiment, the social networking system checks to see if there is a connection between two users already stored in the social networking system. If the users are not already connected, the system sends a request to one user recommending the other user as a potential connection in the social networking system. (For example, if one user is tagged in a photo taken from another user's camera, but the two users have not established a connection in the social networking system, the system may suggest to the users that they may know each other.) In another embodiment, a measure of affinity is determined between the two user accounts based on the actions taken by the users with the images captured using the same camera. Factors used for determining the user affinity based on cameras may comprise types of actions taken by the users associated with the images, the rate at which users perform the actions, the number of images on which the users took actions, and the length of the time interval during which the users took actions, among various other factors. In another embodiment, the social networking system can use the association between two user accounts to help in detecting fake, fraudulent, or additional accounts. For example, if several accounts exist having a profile picture taken from the same camera, the social networking system can use this information along with other information to determine whether the accounts are fake.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

Figure 1:
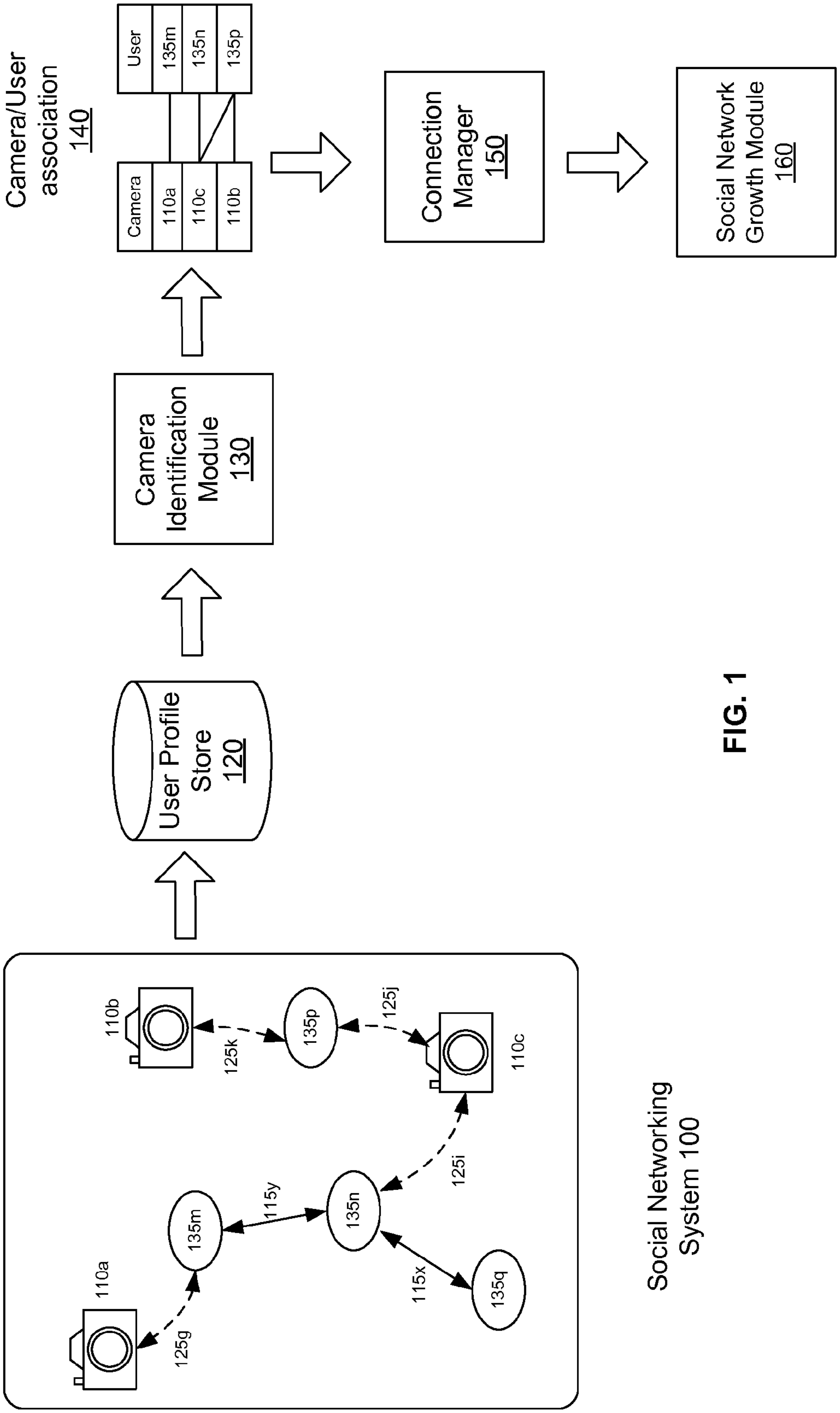
FIG. 1 is a diagram of a process for associating camera signatures with users of a social networking system, in accordance with an embodiment of the invention.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Social networking systems store information about objects representing real world entities and about the relationships between these objects. Examples of objects represented in a social networking system include users, events, groups, or images. Embodiments of the invention store objects representing cameras used for capturing images stored in the social networking system, for example, standalone camera devices as well as cameras embedded within other devices including phones and laptops. Images uploaded by the user are analyzed to determine signatures of cameras used to capture the images. A camera signature comprises features extracted from an image that characterize the camera used for capturing the image. Examples of information extracted from an image that characterizes a camera comprise faulty pixel positions in the camera, lens scratches, dust on lens, camera artifacts, metadata available in a file storing the image including, serial number of the camera, the make and model number of the camera, timezone recorded on an image, and the like. This metadata, faulty pixels, lens scratches, and camera artifacts may act as a shared secret between the user and the online system, as previously uploaded images and videos have had the meta data, faulty pixels, lens scratches, and camera artifacts removed or obscured. Other pixel attributes that can characterize specific cameras include light sensitivity (or lack thereof) for each color, minimum/maximum values for each color, and bleed of bright colored pixels to other pixels. The images can also be analyzed by matching the subject matter of the photograph, such as the person being photographed. Lens artifacts may not be on the image sensor but in the image optical path. Indicated by the zoom level, the affected pixels where the lens scratch will appear may change.

The social networking system stores relationships called connections between users that are created when a user accepts a friend request sent by another user. The social networking system also infers associations between different objects based on information shared between the objects. For example, an association can be inferred between a user tagged in an image and the image object. Embodiments of the invention allow associations to be inferred between users and cameras based on actions relating users with the cameras. Examples of actions relating users with cameras include users uploading images captured using a camera, users being tagged in images taken using a camera, users retrieving images captured using a camera, and the like. The description herein referring to images however also applies to other type of media content comprising images, for example, videos.

Embodiments of the invention further allow associations to be inferred between users of the social networking system that are indirectly related via cameras. For example, a user that uploads an image captured using a camera can be associated with a user that is tagged in an image captured using the same camera. These associations are used beneficially by the social networking system, for example, for promoting growth of the social networking system by recommending potential connections to a user, recommending events and groups to users, identifying multiple user accounts created by the same user, and for determining affinity between users.

FIG. 1 is a diagram of the overall process for associating camera signatures with users of a social networking system and for associating users of a social networking system with each other, in accordance with an embodiment of the invention. The users 135*m*, 135*n*, 135*p*, and 135*q* use one or more cameras 110*a*, 110*b*, and 110*c* to capture images and upload the captured images to the social networking system 100. (A letter after a reference numeral, such as "110*a*," indicates that the text refers specifically to the element having that particular reference numeral, while a reference numeral in the text without a following letter, such as "110," refers to any or all of the elements in the figures bearing that reference numeral.) Users 135 can have connections 115 between them, for example, users 135*m* and 135*n* have connection 115*y*, users 135*n* and 135*q* have connection 115*c* etc. A camera may be shared by two or more users, for example, camera 110*c* is shared by users 135*n* and 135*p*. Similarly, a user may use two or more cameras, for example, user 135*p* uses cameras 110*b* and 110*c*. Two users share a camera if they perform actions associated with images captured using the same camera. Examples of actions associating users with images include uploading of images, getting tagged in an image, retrieving images for viewing, sending images to other users, recommending an image, and the like. The social networking system 100 stores the images uploaded in the user profile store 120. The camera identification module 130 analyzes images uploaded by the user to determine signatures identifying the cameras based on image data and creates associations 140 between the cameras 110 and the users 135. The connection manager 150 uses associations 140 between cameras and users to create associations between users. The social network growth module 160 uses the associations between users determined by the connection manager 150 to promote actions related to growth of the social networking system 100, for example, by recommending potential connections, groups or events to users.

System Architecture

Figure 2:
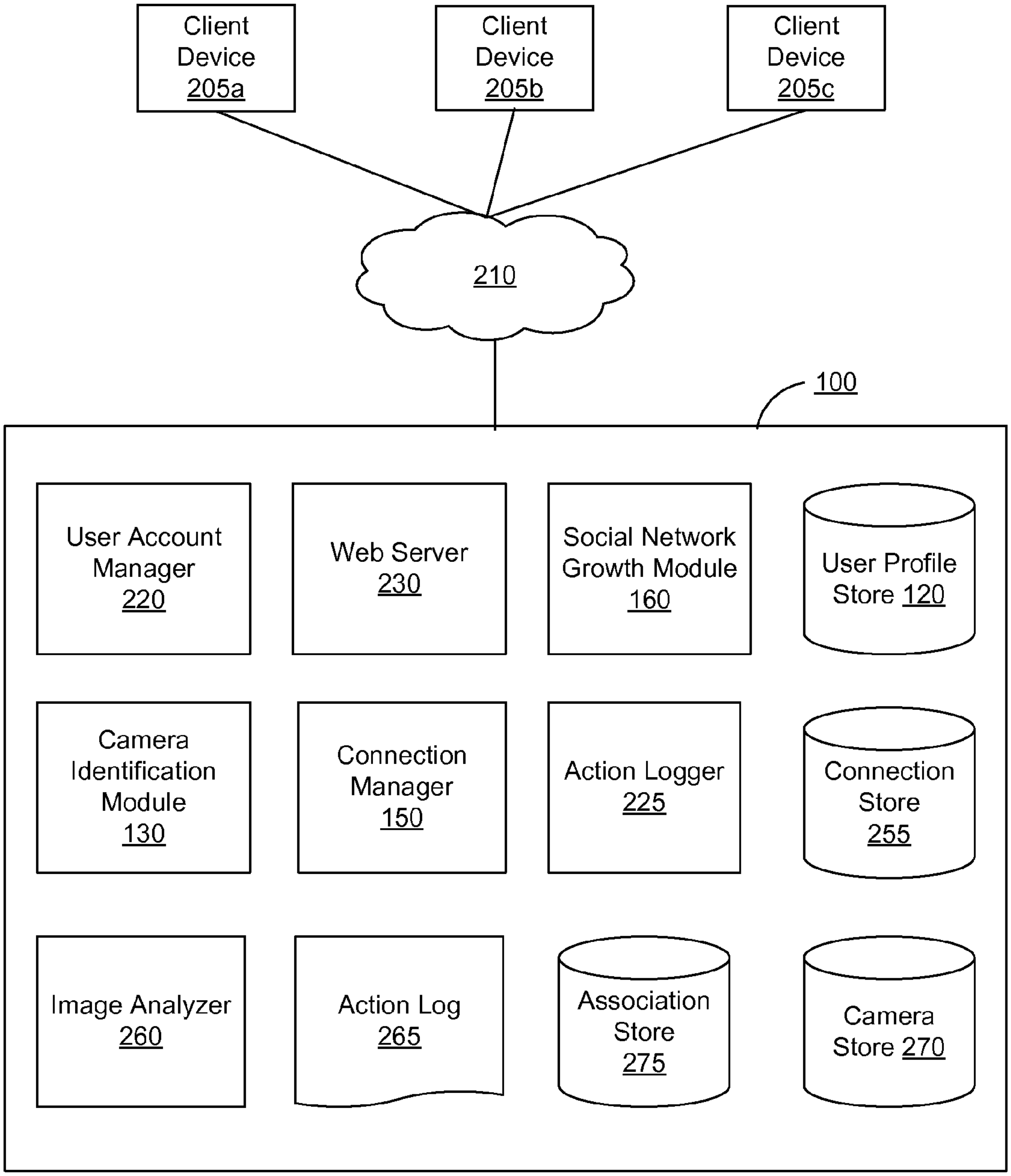
FIG. 2 is a high level block diagram illustrating a system environment suitable for associating cameras with users, in accordance with an embodiment of the invention.

FIG. 2 is a high level block diagram illustrating a system environment suitable for associating cameras with users, in accordance with an embodiment of the invention. The system environment comprises one or more client devices 205, a social networking system 100, and a network 210. In alternative configurations, different and/or additional modules can be included in the system.

The client devices 205 comprise one or more computing devices that can receive user input and can transmit and receive data via the network 210. In one embodiment, the client device 205 is a conventional computer system executing, for example, a Microsoft Windows-compatible operating system (OS), Apple OS X, and/or a Linux distribution. In another embodiment, the client device 205 can be a device having computer functionality, such as a personal digital assistant (PDA), mobile telephone, video game system, etc. The client device 205 is configured to communicate via network 210. The client device 205 can execute an application, for example, a browser application that allows a user of the client device 205 to interact with the social networking system 100. The interactions of the user via the application running on the client device 205 include uploading media content including images and videos to the social networking system 100 as well retrieving media content or information stored on the social networking system 100.

In one embodiment, the network 210 uses standard communications technologies and/or protocols. Thus, the network 210 can include links using technologies such as Ethernet, 802.11, worldwide interoperability for microwave access (WiMAX), 3G, digital subscriber line (DSL), etc.

Similarly, the networking protocols used on the network 210 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 210 can be represented using technologies and/or formats including the hypertext markup language (HTML), the extensible markup language (XML), etc. In addition, all or some of links can be encrypted using conventional encryption technologies such as secure sockets layer (SSL), transport layer security (TLS), Internet Protocol security (IPsec), etc. A user can use a client device 205 to upload images to the social networking system 100 via the network 210 and also retrieve the images stored on the social networking system 100 for viewing.

The social networking system 100 includes a user account manager 220, a web server 230, an action logger 225, a user profile store 120, a connection store 255, a camera store 270, a social network growth module 160, an action log 265, a camera identification module 130, a connection manager 150, an image analyzer 260, and an association store 275. In other embodiments, the social networking system 100 may include additional, fewer, or different modules for various applications. Conventional components such as network interfaces, security mechanisms, load balancers, failover servers, management and network operations consoles, and the like are not shown so as to not obscure the details of the system.

The web server 230 links the social networking system 100 via the network 210 to one or more client devices 205; the web server 230 serves web pages, as well as other web-related content, such as Java, Flash, XML, and so forth. The web server 230 may provide the functionality of receiving and routing messages between the social networking system 100 and the client devices 205, for example, instant messages, queued messages (e.g., email), text and SMS (short message service) messages, or messages sent using any other suitable messaging technique. The user can send a request to the web server 230 to upload information, for example, images or videos that are stored in the user profile store 120. The user can also send a request to connect to another user. If the request for connection is accepted by the other user, a connection between the two users is created and stored in the connection store 255.

The action logger 225 is capable of receiving communications from the web server 230 about user actions on and/or off the social networking system 100. The action logger 225 populates the action log 265 with information about user actions to track them. Any action that a particular user takes with respect to another user is associated with each user's profile, through information maintained in a database or other data repository, such as the action log 265. Such actions may include, for example, adding a connection to the other user, sending a message to the other user, uploading an image, reading a message from the other user, viewing content associated with the other user, attending an event posted by another user, among others. In addition, a number of actions described below in connection with other objects are directed at particular users, so these actions are associated with those users as well.

The user account manager 220 allows users of the social networking system 100 to create user accounts in the social networking system 100. In an embodiment, the user account manager 220 performs a check across user accounts to identify if the same user has created multiple accounts. The user account manager 220 stores user account information and other related information for a user in the user profile store 120. The user profile information stored in user profile store 120 describes the users of the social networking system 100, including biographic, demographic, and other types of descriptive information, such as work experience, educational history, gender, sexual preferences, hobbies or preferences, location, and the like. The user profile may also store information provided by the user, for example, images or videos. In certain embodiments, a user may tag an image with the identification information of appropriate users displayed in the image.

The image analyzer module 260 analyzes images uploaded by a user to determine information characterizing the cameras used to capture the images. The image analyzer module 260 analyzes the metadata available in image files or the pixel data of the images to determine specific characteristics of a camera used to capture images. For example, the image analyzer module 260 extracts metadata including serial number, model and make of the camera, pixel dimensions, image resolution and other characteristics useful to determine if an image was taken from a specific camera.

The image metadata may be represented using a standard format, for example, the exchangeable image file format (EXIF). Some attributes of the metadata can be used to associated the image with a specific camera with a very high degree of certainty, for example, if the image metadata includes a serial number of the camera, the serial number can be used to uniquely map the images to a specific camera. Other attributes obtained from image metadata can be used to map the image to a camera with lesser degree of certainty. For example, the make and model number of a camera, if available in the image metadata helps correlate the images to a camera to a lesser degree compared to a serial number. However, such attributes can be combined with other attributes to confirm a particular camera signature. In an embodiment a weighted combination of various attributes is used to determine a camera signature associated with images. Other attributes used for determining camera signature include pixel dimensions of the image, a version of software installed on the camera, image resolution, focal length, shutter speed, ISO, lens type, image compression used etc. Typically attributes of image metadata useful for identifying a camera are attributes that do not change with every image. These attributes may correspond to a default setting that was provided with the camera and is used in metadata of images.

Some features associated with images indicate that the images belong to a set of associated images. For example, a user may capture several images during a trip. These images can have geographical data, for example, latitude, longitude, or altitude that is likely to be in close proximity. Similarly, these images may have a time of capture within close proximity of each other indicating the images were captured together and are likely to be taken from the same camera. These attributes can be used to correlate various images and use the image correlation to determine a signature for the camera associated with the images. In some embodiments, the names of the image files can be used to correlate images since a camera can assign names to the image files automatically and the names may be preserved when the user uploads the image files. These attributes may change from one image to another but exhibit a specific pattern, for example, the attribute values may monotonically increase or increase at a regular interval. In an embodiment, several images uploaded together by a user are correlated together and analyzed to determine if they were taken from the same camera. Images uploaded together can be further analyzed as being taken from the same camera if a user has a pattern of capturing several images and uploading them at the same time. The upload time of the images can be obtained from the action log 265.

It is common that camera clocks are not set correctly. For example a user may upload images or videos with metadata indicating that the images were taken 22 hours in the future (clock skew). Accordingly, when two or more images or videos are uploaded and have matching clock skew, this is considered a factor in determining whether the images were captured by the same camera.

The image analyzer module 260 also extracts unique patterns of faulty pixel positions associated with the images. A faulty pixel displays a constant value (or one of a set of constant values) at the specific position regardless of the input received by the camera. A normal pixel in contrast shows one of a range of values of color depending on the input received by the camera. For example, the faulty pixel may show a color that is different from a normal pixel subject to identical exposure. As a result, a distribution of the parameters associated with a faulty pixel, for example, the distribution of color as observed over several images is different from the corresponding distribution of a working or non-faulty pixel. For example, a working pixel may have a normal distribution of the pixel attributes observed over several images whereas the faulty pixel is likely to have a skewed distribution compared to the working pixel. The image analyzer module 260 analyzes distribution of various pixels over a set of images and compares the distributions for the different pixels. Typically a significant percentage of pixels are working pixels and show a normal distribution whereas some faulty pixels show a skewed distribution. These variations in the distribution of pixel values are used to identify faulty pixels.

In some embodiments, a pixel comprises elements displaying different colors, for example, a pixel can comprise three elements with signals corresponding to red, green, and blue colors (RGB elements). One or more of these elements can be faulty resulting in a particular color missing or always being present in the pixel irrespective of the input picture. Accordingly, the specific element of the pixel can be considered faulty. If a portion of a pixel is faulty, the pixel is considered faulty.

The camera identification module 130 stores an object representing each new camera identified in the camera store 270 along with information describing the camera signature of the camera, for example, the position of faulty pixels of the camera and image metadata including the manufacturer and model number of the camera and the serial number of the camera. Once the camera identification module 130 associates a camera with a user, the camera identification module 130 compares subsequently uploaded images against the signatures of cameras associated with the user. If new images uploaded provide additional metadata for the camera that was not available previously, the camera identification module 130 updates the information characterizing the camera in the camera store 270. In some situations, information characterizing the camera can be overwritten, for example, if the user changes a default setting. However the camera authentication module 130 ensures that the image shows significant match against the camera signature and is not likely to be taken with a different camera. If the mismatch compared to the camera signature is above a threshold value (for example, based on a weighted combination of various attribute matches/mismatches) a new camera signature is created and stored in the camera store 270 and associated with the user. For example, if the faulty pixel positions of the newly uploaded images is different from the faulty pixel positions of the stored camera signatures or if the serial number, make and model numbers obtained from the metadata of the uploaded images indicates that the uploaded images were captured by a new camera, a new camera object is created and stored in the camera store 270.

The camera identification module 130 uses the information analyzed by the image analyzer module 260 to determine camera signatures that are stored in the camera store 270. The camera identification module 130 matches information extracted from multiple images to determine whether the images are related to a specific camera. In some embodiments, the camera identification module 130 associates attributes of images used for associating the images with camera with a confidence score indicative of a degree of certainty with which the association is determined. For example, the serial number of a camera if available in the image metadata provides a higher level of certainty compared to make of the camera. Similarly a unique set of faulty pixels in images captured from a camera is given a confidence score indicative of high degree of certainty compared to the make and model of the camera. However, a mismatch in an attribute like make or model or pixel resolution of the camera can be used to reject the image as having been captured using a specific camera.

Other types of information used for associating an image with a camera include naming conventions of files storing the images, for example, a camera can use a monotonically increasing alphanumeric string for automatically naming consecutively captured images. Therefore, if the names of the images form an alphanumeric sequence that is monotonically increasing, an image file that has a name belonging to the sequence is likely to be taken from the same camera.

The image metadata provides information that allows correlation of images. If a set of images are determined to be correlated, even if a subset of the images is determined to be captured by a camera, the remaining images of the set can be assumed to be captured by the same camera (unless other factors indicate otherwise). For example, images may be correlated if the image metadata, for example, time of capturing of the image indicates that the images were captured during a very short time interval at the same place. Similarly, images can be considered correlated if they have matching geographical data, for example, images captured by a user during a trip are likely to have latitude, longitude, or altitude that is in close proximity. Therefore, unless there is evidence to the contrary, these correlated images can be assumed to be captured by the same camera.

In an embodiment, the camera identification module 130 compares a newly discovered camera signature against existing camera signatures stored in the camera store 270 to determine if the camera was already stored in the camera store 270. For example, the user may have borrowed the camera from another user of the social networking system 100. In this situation, the existing camera object is identified from the camera store 270 and the user is associated with the existing camera object.

In an embodiment, the camera identification module 130 tracks usage of the cameras to identify cameras that the user stopped using. For example, if no images are being uploaded with a particular camera signature for a long period of time (exceeding a threshold value), the camera can be marked as not being in use. Alternatively, the camera identification module can delete the camera from the camera store after a particular time period, if no pictures taken from the camera are uploaded by the user during this time interval. In some embodiments, the camera object is not deleted from the camera store 270 but the association between the user and the camera is deleted. For example, the camera may be sold or gifted to another user and there is a possibility that the camera is used by another user in future to capture images and upload them. Similarly, the camera may be lost by one user of the social networking system 100 but recovered by another user of the social networking system 100. If the other user uploads images taken from the recovered camera, the social networking system 100 changes the association of the camera from one user to another. Accordingly, the representation of the mapping from users to cameras stored in the social networking system 100 adaptively changes over time to represent the real world association between users and their cameras.

In another embodiment, users of the social networking system 100 are requested to provide specific information related to cameras previously used to capture pictures uploaded to their user account. The user can further provide information associating the camera with one or more images uploaded by the user. The information provided by the users is combined with information derived from the images. For example, faulty pixel positions determined by analyzing images are associated with a serial number of the camera provided by a user.

The connection manager 150 manages data describing one or more connections between different users of the social networking system 100. The connection manager 150 stores the information describing the connections in the connection store 255. The connections are defined by users, allowing users to specify their relationships with other users. For example, the connections allow users to generate relationships with other users that parallel the users' real-life relationships, such as friends, co-workers, partners, and so forth. In some embodiment, the connection specifies a connection type based on the type of relationship, for example, family, or friend, or colleague. Users may select from predefined types of connections, or define their own connection types as needed.

The connection manager 150 also identifies associations (also referred to as relations) between various objects stored in the social networking system 100, for example, images, cameras, or user accounts and stores information describing the association in association store 275. In contrast with a connection which is created by a user accepting a friend request sent by another user, an association can be inferred by the connection manager 150 based on information relating two objects, for example, users, events, images, or groups. In an embodiment, the connection manager 150 creates an association between a camera object stored in the camera store 270 and a user account object if the user account is used to upload images captured by the camera. Similarly, the connection manager 150 can create an association between an image and the account of a user tagged in the image. The connection manager 150 can also identify objects that are indirectly associated via a third object and create an association between these objects. For example, if an association exists between a user and an image in which the user is tagged and another association exists between the image and a camera object, the connection manager 150 can infer an association between the user and the camera. Similarly, two users may not have a connection based on acceptance of a friend request but may be associated with the same camera based on actions taken on images captured using the camera. In this case, the connection manager 150 infers an association between the two users and stores the information in the association store 275.

The social network growth module 160 performs actions that promote growth of the social networking system 100. The social network growth module 160 attempts to increase the number of connections between the users of the social networking system 100 as well as overall activities of the users of the social networking system 100. For example, the social network growth module 160 recommends to a user, other users that the user is likely to know but is not connected to. Prompting a user with the names of people that the user is likely to know increases the chances that the user will send a friend request to them, thereby increasing the chances that the user will create a connection with them. The social network growth module 160 also encourages users to interact more frequently with other users, or participate in activities, for example, by becoming members of groups or running applications provided on the social networking system 100. The social network growth module 160 uses affinity between users to identify and recommend events in which at least some of the participants are associated with the user even though they are not connected with the user.

Representing Camera in a Social Graph

In one embodiment, a camera is represented as a node in the social graph with edges to other nodes based on actions associated with the camera. For example, an action comprising uploading of an image captured by a camera is represented by an edge between the image and the camera as well as an edge between the user uploading the image and the camera. Similarly, tagging a user in an image captured with a camera is represented by an edge between the user and the image as well as an edge between the user and the camera. Other actions used for associating cameras with users include a user retrieving an image captured by a camera, a user commenting on an image captured by the camera, a user indicating that the user likes the image, a user recommending the image, or forwarding the image to another user.

The connection manager 150 infers associations between various nodes and stores them in the association store 275. The connection manager 150 can also store in the association store 275, information indicating how an association was inferred. The connection manager 150 creates an association between a user and a camera if there is an action relating the camera with the user. As an example, the connection manager 150 creates an association between two users that uploaded images captured by the same camera. Alternatively, the connection manager 150 creates an association between a user that uploaded images captured using a camera and a user that was tagged in images captured using the camera. These associations are stored in the association store 275 along with information describing the type of action associated with the camera, for example, uploading of an image by a user, tagging of a user in an image, or a user retrieving an image for viewing.

The connection manager 150 can infer associations between objects that are transitively related via existing associations. For example, an association may be created between two objects that are associated with a third object. If the connection manager 150 identifies two users that are associated with a camera, the connection manager 150 creates an association between the two users. For example, a user may be associated with a camera because the user uploaded images captured using the camera. Another user may be associated with the same camera because the other user was tagged in images captured using the camera. The connection manager 150 can infer an association between these two users based on their association with the same camera.

Figure 3:
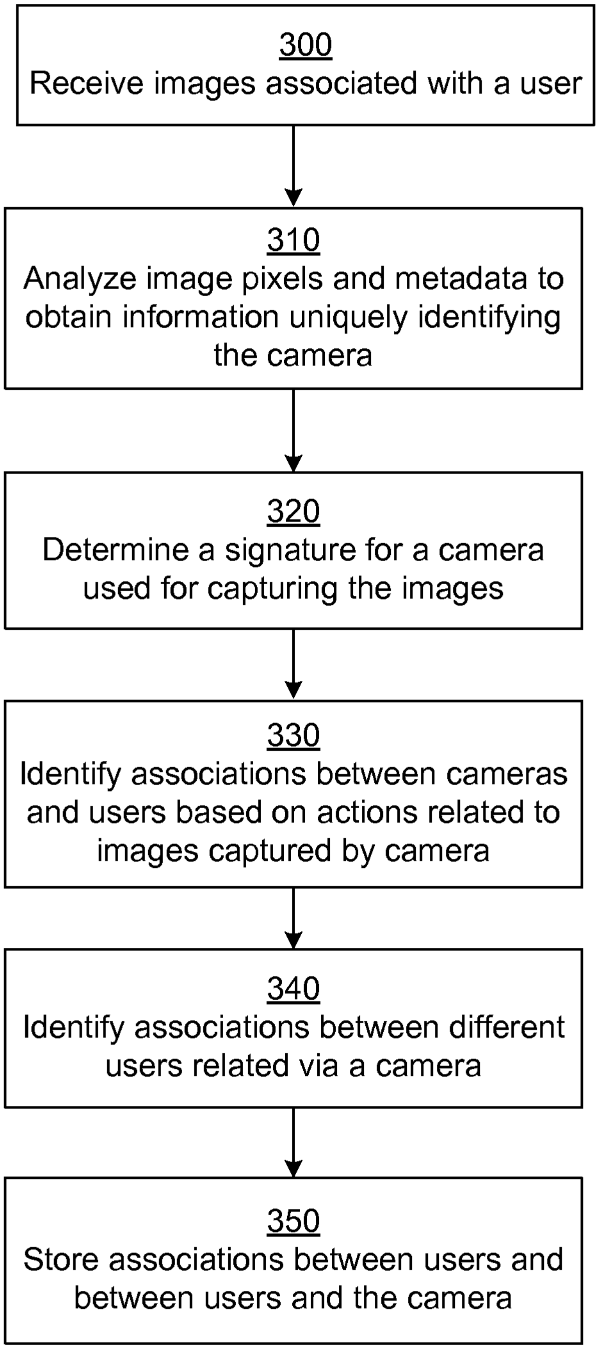
FIG. 3 is a flowchart of a process for creating associations between cameras and users and between users of a social networking system, in accordance with one embodiment of the invention.

FIG. 3 is a flowchart of a process for determining associations between cameras and users of a social networking system 100 as well as associations between users of the social networking system 100, in accordance with one embodiment of the invention. The process described in FIG. 3 is not limited to social networking systems but can be applied to other online systems that allow users to create user accounts and upload images associated with their accounts. The web server 230 receives 300 images associated with a user, for example, images uploaded by a user in the social networking system. The camera identification module 130 analyzes 305 pixel data of the images received to identify faulty pixels in the images. The camera identification module 130 analyzes 310 the images to obtain metadata uniquely identifying a camera used for capturing the images. The camera identification module determines 320 a unique signature for a camera comprising features of images taken from the camera that can be observed using the metadata stored in the image files and the faulty pixel positions. In some embodiments, a confidence score is provided to indicate a degree of certainty with which the image is determined to be taken by the camera. The connection manager 150 identifies 330 associations between cameras and users based on user actions related to images captured by the cameras, for example, uploading images, being tagged in images, recommending images etc. The connection manager 150 identifies 340 associations between users based on associations between users and cameras. The connection manager 150 stores 350 the associations between users and between users and cameras in the association store 275.

Utilizing Camera Based Associations in a Social Networking System

Figure 4:
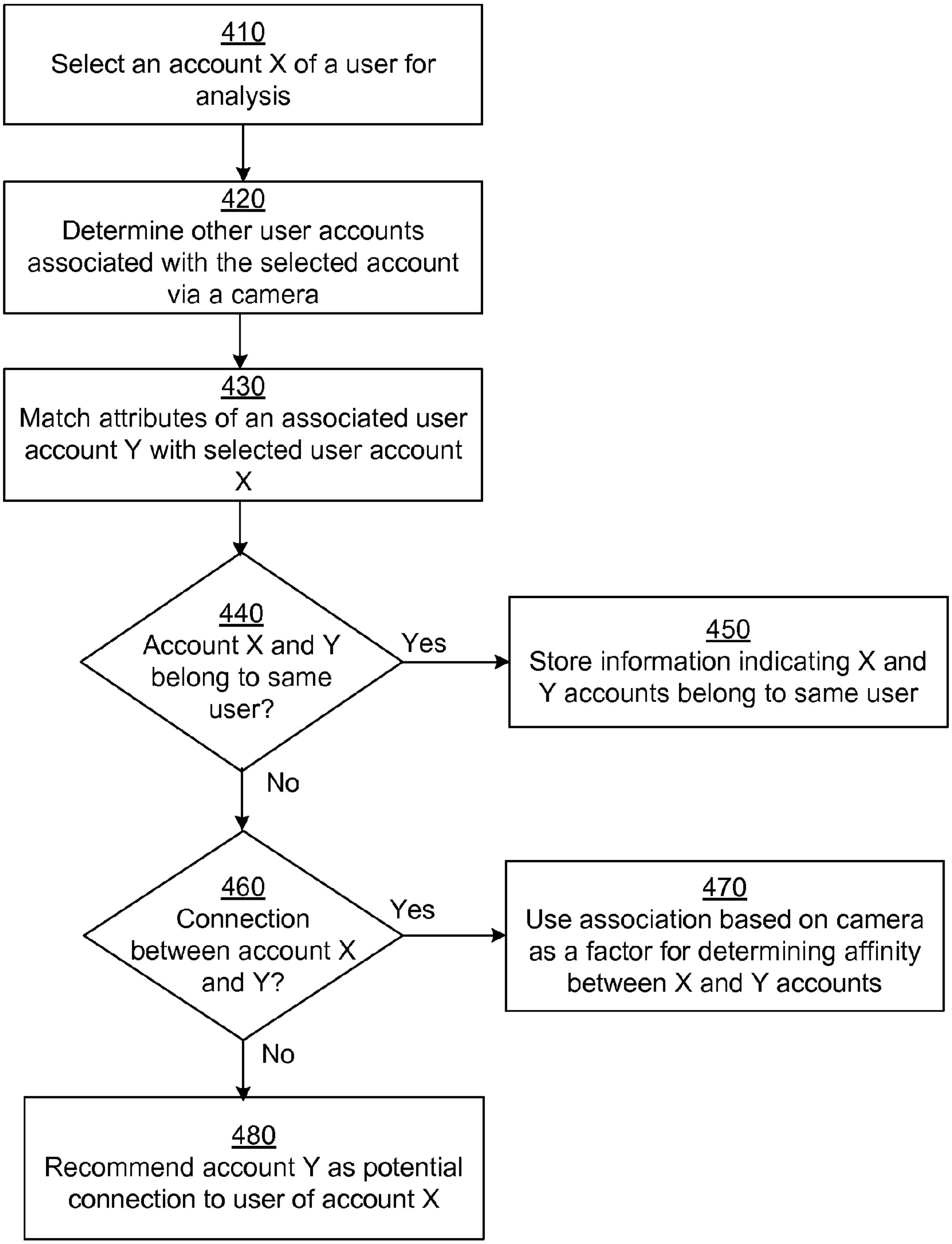
FIG. 4 is a flowchart of a process for utilizing associations based on cameras between users of a social networking system for performing actions in the social networking system, in accordance with one embodiment of the invention.

FIG. 4 is a flowchart of a process for utilizing associations based on cameras between users of a social networking system, in accordance with one embodiment of the invention. The connection manager 150 selects 410 a user account for analysis. The connection manager 150 determines 420 other user accounts associated with the selected user account via camera(s). The connection manager 150 further matches the associated user accounts with the selected user account based on attributes, for example, user profile information, connections, user actions and the like. Analysis of the accounts is performed to verify 440 if the accounts belong to the same user. For example, user profile information can be compared to identify overlap in the information of the two accounts. Connections of the two users can be compared to identify overlap in the connections. If two accounts are determined 440 to belong to the same user, information indicating this fact is stored 450 in the association store 275. If the user accounts that share a camera are determined 440 to belong to different users, the connection manager 150 checks 460 if there is a connection between the users. If the connection manager 150 finds that there is an existing connection between the two user accounts, the sharing of camera is used as a factor in determining 470 the affinity between the two users. If there is no connection between the users, the social network growth module 160 uses the associations between users to recommend 480 potential connections to users as described in detail herein.

Detecting Fake User Accounts Based on Sharing of Camera Signatures

The user account manager 220 analyzes user accounts stored in user profile store 120 to determine the likelihood that two or more user accounts belong to the same user. The user account manager 220 identifies user accounts that are associated via cameras and analyzes these user accounts to determine whether they belong to different users or the same user. In an embodiment, the user account manager 220 determines a metric indicative of the likelihood that two user accounts belong to the same user.

The user account manager 220 compares the connections of the two user accounts. Significant overlap in the connections of the two user accounts indicates higher likelihood that the user accounts belong to the same user. The user account manager 220 compares user profile information, for example, user interests, demographic information, and the like. A significant overlap in the user profile information of user accounts indicates high likelihood that the two accounts belong to the same user. Alternatively, significant differences in the user profiles of the accounts indicate that the two accounts belong to different users.

The user account manager 220 also analyzes parameters associated with the sessions created using the two user accounts. For example, the internet protocol (IP) address or information identifying the client devices used for creating the session is compared. Similarly, other information related to user sessions can be compared including, information describing the application used to create a session, for example, a browser application, cookies stored on the client devices, patterns associated with the sessions, for example, the typical time of the day at which the sessions are created, the days of the week during which the sessions are created, the lengths of the sessions. User accounts having similarities based on camera signatures and other factors that do not have any connections between them are suspected to be fake accounts created by the same user.

In an embodiment, the user account manager 220 computes a weighted combination based on various factors to determine a level or degree of match between the user account information. For example, overlap in camera signatures associated with the user accounts is given higher weight compared to user profile information, since the user profile information can be easily edited by the user. Similarly, the parameters associated with sessions created using the two user accounts are given higher weight compared to user profile information. In an embodiment, uploading of images taken from a camera is weighted higher than getting tagged in an image taken from the same camera, since uploading of images is a stronger indication of physical possession of the camera.

In some embodiments, two accounts sharing a camera suspected of belonging to the same user are further analyzed to eliminate the possibility that the two accounts belong to different users. For example, two married users are likely to physically share the same camera even though they have different user accounts. Therefore, the two accounts are analyzed to determine if there is a relationship defined between the two users in the user profile, for example, if the two users are married or belong to the same family as defined by the user profile information of one of the accounts or by a third account. For example, a parent's user account can be used to determine whether two users are siblings. Accordingly, if the user account manager 220 determines that the two user accounts share a camera but factors indicate that the accounts belong to different users, the user account manager 220 manager stores this information.

The social networking system 100 can confirm whether the suspect accounts belong to the same or different users by requesting the user(s) to provide forms of identification, for example, photo identification such as a passport or drivers license. The social networking system 100 can request the users to call and confirm that the user accounts belong to different users. The social networking system 100 can also request the users to provide additional information, for example, social security number that must be unique for two different users.

Determining Affinity Between Users Associated Via Cameras

The connection manager 150 determines affinity scores for associations between users of the social networking system 100. For example, two users frequently interacting with each other are considered closer than two users that rarely interact with each other and therefore have higher affinity. The connection manager 150 determines affinity scores between users based on various factors, for example, the types of interactions between the users, the frequency of interactions between the users etc. In an embodiment, the affinity score is a weighted aggregate value comprising metrics based on various factors related to user interactions.

The connection manager 150 can determine affinity between users that have a connection between them as well as users that do not have a connection between them but are associated with each other, for example, by sharing a camera based on actions performed on images taken by the camera. An association between users that share a camera repeatedly over a long period of time indicates a stronger association between the users compared to users that shared the camera only a few times. Users with stronger association are assigned higher affinity score.

In an embodiment, the number of actions associated with images captured using a camera is used to determine the degree of closeness between the users. For example, two users uploading photos captured by the same camera are assigned higher affinity compared to two users that rarely share cameras. The user affinity score based on camera sharing can also be based on the number of images captured from the same camera in which two users share actions. The higher the number of images captured from a camera in which users share actions, the higher the user affinity score. The user affinity score based on a user being tagged in an image can be normalized based on the number of users tagged in an image. For example, if a user is tagged in an image along with a large number of users, the user affinity score based on this action is less compared to a similar scenario with fewer users tagged in the image. A large number of users being tagged in an image indicates that the association of each individual user with the camera or with another user based on this action is small.

The connection manager 150 can determine affinity between users based on frequency of their actions associated with the same camera(s). Higher frequency of user actions associated with the same camera is indicative of higher affinity between the users. The connection manager 150 uses the type of actions associated with the same camera for determining the affinity between the users. For example, an association between two users uploading images captured by the same camera is assigned higher affinity compared to an association between one user uploading an image and the other user being tagged in the uploaded image. The connection manager 150 uses the length of time interval over which users took actions associated with the camera as a factor in determining user affinity. Longer interval of time during which two users perform actions associated with a camera is indicative of higher affinity between the users.

If two users are associated with different sets of images captured from the same camera, the time of capture and geographical location of capture of images, if available in the image metadata is used as a factor in determining the user affinity. If two users are tagged in or upload images that were captured by the same camera during a fixed time interval at the same location, there is a high likelihood that the two users went on a trip and there is a close association between the users. As a result, the connection manager 150 assigns high affinity scores to these users.

Recommending Actions Based on User Associations Via Cameras

The social network growth module 160 identifies users of the social networking system 100 that are associated with each other via the same camera and uses these associations to make recommendations to a user. Examples of recommendations include actions that a user can take including sending a friend request to a user to establish a connection, joining a group, or attending an event. For example, if the social network growth module 160 identifies that two users share a camera but are not connected in the social networking system 100, the social network growth module 160 can recommend each user as a potential connection to the other user. The social network growth module 160 assumes that users associated with each other via actions associated with the same camera are likely to know each other. As a result the users are likely to follow the recommendation, thereby creating a connection between them and causing growth of the social network.

The social network growth module 160 uses associations based on cameras as indication of the fact that the selected user is likely to know the associated users whether or not there is a connection established between them. The social network growth module 160 selects a user and makes recommendations of groups to the selected user if there are other users associated with the selected user that are already members of the group. Similarly, the social network growth module 160 makes recommendations of an event to a user if there are other users associated with the user that are participating in the event. These other users can be associated with the selected user if they share a camera with the user. The selected user is likely to join a group if there are other users that the user knows in the group. Similarly the selected user is likely to be interested in an event if the selected user knows other users who are are attending the event.

In an embodiment, the social network growth module 160 prefers a recommendation based on an association with higher affinity score between users compared to an association based on lower affinity score. For example, the social network growth module 160 can present only a subset of the recommendations with highest affinity scores based on sharing of cameras with a selected user. Alternatively, the social network growth module 160 can use the affinity scores to order the list of recommendations, presenting recommendations with higher scores ahead of recommendations with lower scores.

Therefore, having a camera as a node in the social graph allows the social networking system 100 to infer new associations between users. These associations are used by the social networking system to promote growth of the social networking system. These associations are also used by the social networking system for inferring other types of information including multiple user accounts created by the same user.

Alternative Applications

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer implemented method for creating associations between users of a social networking system, the method comprising:

receiving images from a user of a social networking system;

associating one or more received images with a signature of a camera used to capture the received images, wherein the signature of the camera comprises characteristic information about the camera obtained from images taken from the camera;

identifying a first user account associated with the camera based on an action related to the first user account and at least one image captured using the camera;

identifying a second user account associated with the camera based on an action related to the second user account and at least one image captured using the camera; and storing an association between the first user account and the second user account.

2. The computer implemented method of claim 1, further comprising:

matching the first user account information with the second user account information;

responsive to determining that the first user account information matches the second user account information, determining a measure of likelihood that both user accounts belong to the same user.

3. The computer implemented method of claim 2, wherein matching the first user account information and the second user account information comprises comparing user profile information of the first user account and the second user account.

4. The computer implemented method of claim 2, wherein matching the first user account information and the second user account information comprises comparing connections of the first user account and the second user account.

5. The computer implemented method of claim 2, wherein matching the first user account information and the second user account information comprises comparing information describing sessions created by the first user account and the second user account.

6. The computer implemented method of claim 2, wherein responsive to determining that the first user account information matches the second user account information, the likelihood of both user accounts belonging to the same user is higher if there are no connections between the accounts compared to the likelihood when both accounts are connected.

7. The computer implemented method of claim 1, further comprising:

determining a measure of affinity between the first user account and the second user account based on information describing their actions associated with the one or more received images.

8. The computer implemented method of claim 7, wherein the information describing the actions comprises types of the actions associating the first and second user accounts with the camera signature.

9. The computer implemented method of claim 7, wherein the information describing the actions comprises a frequency of actions associating the first and second user accounts with the camera signature.

10. The computer implemented method of claim 7, wherein the information describing the actions comprises a number of images on which the actions are performed.

11. The computer implemented method of claim 7, wherein the information describing the actions comprises a length of time interval during which the actions are performed.

12. The computer implemented method of claim 1, further comprising:

sending a request to the user of the first user account recommending the second user account as a potential connection between the first user account and the second user account.

13. The computer implemented method of claim 12, further comprising:

verifying if a connection exists between the first user account and the second user account.

14. The computer implemented method of claim 12, wherein the request recommending the second user account as a potential connection is sent responsive to determining that the first user account and the second user account are not already connected.

15. The computer implemented method of claim 1, wherein the actions further comprise a user being tagged in a received image.

16. The computer implemented method of claim 1, wherein the actions further comprise a user retrieving the image.

17. The computer implemented method of claim 1, wherein the actions further comprise a user recommending an image to another user.

18. The computer-implemented method of claim 1, wherein the characteristic information used to determine signature of the camera comprises one of faulty pixels in the images, lens scratches, lens dust, and camera artifacts.

19. The computer-implemented method of claim 18, wherein a faulty pixel has a fixed value for any image captured by the camera irrespective of the input received by the camera.

20. The computer-implemented method of claim 1, wherein the characteristic information used to determine signature of the camera comprises metadata attributes from files associated with the images.

21. The computer-implemented method of claim 20, wherein the metadata attribute is at least one of a serial number, a make of the camera, and a model number of the camera.

22. The computer-implemented method of claim 20, wherein the metadata attribute is at a time setting indicative of the time of capture of the image.

23. The computer-implemented method of claim 20, wherein the metadata attribute is a geographical location associated with the place where the image was captured.

24. The computer-implemented method of claim 20, the metadata attribute is a name of the image file.

25. The computer-implemented method of claim 20, wherein matching a metadata attribute comprises determining if the attribute value belongs to a sequence described by attribute values extracted from the plurality of images.

26. The computer-implemented method of claim 1, wherein analyzing the images comprises determining a distribution of pixel values across images and identifying pixels with skewed distribution of pixel values.

27. The computer-implemented method of claim 1, wherein a camera signature comprises an attribute of metadata associated with images with monotonically changing values for images taken consecutively from the camera.

28. A computer implemented method for associating users of a social networking system with cameras, the method comprising:

receiving images from a user of a social networking system;

analyzing the received images to identify a signature of a camera that captured the received images, wherein the signature of the camera comprises characteristic information about the camera obtained from images taken from the camera;

identifying user accounts associated with the camera based on an action related to the user accounts and at least one image captured using the camera;

associating the camera with the identified user accounts; and storing the associations between the identified user accounts and the camera.

* * * * *